United States Patent [19]
Chevalier

[11] 3,726,300
[45] Apr. 10, 1973

[54] GAS MIXING DEVICE
[75] Inventor: Marcel Chevalier, Paris, France
[73] Assignee: L'Air Liquide, Societe Anonyme Pour L'Etude Et L'Explitation Des Procedes Georges Claude, Paris, France
[22] Filed: Oct. 26, 1970
[21] Appl. No.: 83,886

[30] Foreign Application Priority Data
Nov. 3, 1969   France..................................6937711

[52] U.S. Cl.....................................137/88, 137/606
[51] Int. Cl.............................................F16k 19/00
[58] Field of Search.......................137/98, 100, 101, 137/111, 101.19, 88

[56] References Cited
UNITED STATES PATENTS
3,527,241   9/1970   Bristow...................................137/98
3,217,730   11/1965  Banning................................137/111
3,493,005   2/1970   Kakegawa............................137/100
3,426,784   2/1969   Vick......................................137/111

FOREIGN PATENTS OR APPLICATIONS
857,927   5/1958   England..................................137/98

Primary Examiner—Robert G. Nilson
Attorney—Young & Thomposn

[57] ABSTRACT

A device for supplying a container with a mixture of gases in fixed proportions and comprising, at each gas inlet, a pressure-reducing valve and a flow constriction. The difference in the pressures at the two sides of each flow constriction is the same; it is kept substantially constant by controlling the pressure-reducing valves by a pressure which follows the pressure in the container.

8 Claims, 2 Drawing Figures

PATENTED APR 10 1973

3,726,300

INVENTOR
MARCEL CHEVALIER
BY Young & Thompson
ATTYS

GAS MIXING DEVICE

The present invention concerns gas mixing devices for filling and for keeping filled between a fixed minimum pressure and a fixed maximum pressure a container with a mixture of at least two gases in proportions fixed in advance, from sources of these gases, comprising successively for each gas between its gas source and the container a pressure-reducing valve and an element for producing a loss of head, the pressure-reducing valves for the various gases being adjusted to give substantially one and the same downstream pressure.

Mixing devices of this kind functioning discontinuously, can give very varied mean mixture deliveries. They lend themselves to providing mixtures wherein one component exits only in a small proportion.

Each of the gases to be mixed may be itself a mixture, of fixed composition, of several gases.

In some known devices of this kind, the common regulation pressure of the pressure-reducing valves is fixed. If this pressure is not much greater than that in the container, in order to prevent the emptying of the gas sources from being very imperfect and in order to utilize the usual pressures for the dispensing of gas under pressure, the comparison of the gas flow rates is difficult: the indication of each flowmeter diminishes in proportion as the container changes from its minimum pressure to its maximum pressure.

This disadvantage is obviated in other known devices by the addition of an "overflow device" between the container and the elements for producing a loss of head. An overflow device is a device which keeps constant the pressure of the gas arriving at it; it is a delicate device if it is desired that this pressure cannot be more than slightly greater than the downstream pressure.

The device according to the invention obviates these disadvantages whilst requiring only a small pressure loss, since the elements producing a loss of head operate with a pressure difference which may remain small since it is constant. When the pressure upstream of the elements producing a loss of head varies, the indication of the flowmeters situated at this place does not vary when the pressure varies in the container, if this indication varies as the flow measured in volume and at atmospheric pressure at this place, multiplied by the square root of the pressure; this is the case with certain flowmeters, those of the float type for example. In fact, the speed of the gas in the element creating a loss of head is lower than the speed of sound in this gas, which is the case if the difference in the pressures on either side of this element is small relatively to the upstream pressure. The rate of flow, measured at atmospheric pressure, is a function of this pressure difference, which is constant, and proportional to the square root of the upstream pressure, which is the same factor as for the flowmeter in question.

Another advantage of the device according to the invention is that it requires only a moderate pressure loss, namely that in the pressure-reducing valve and that in the elements for creating a loss of head. As a result it is possible to empty the gas sources almost up to the minimum pressure acceptable for the container to be filled. For example, in the case of filling a container whose minimum and maximum pressures are 4 bars and 5 bars, a pressure loss of 0.5 bar is sufficient to produce a mixture with a very satisfactory precision.

The device according to the invention is characterized in that said same downstream pressure exhibits a substantially constant difference from the pressure in the container when the expansion valves deliver gas and in that, for none of pressure-reducing valves, is the control pressure or the downstream pressure controlled by the pressures of the other pressure-reducing valve, or valves when there are more than two gases to be mixed.

For example, the expansion valves are of gas-tight control chamber type, and when they deliver their control chambers are connected to the container.

Figure 1:
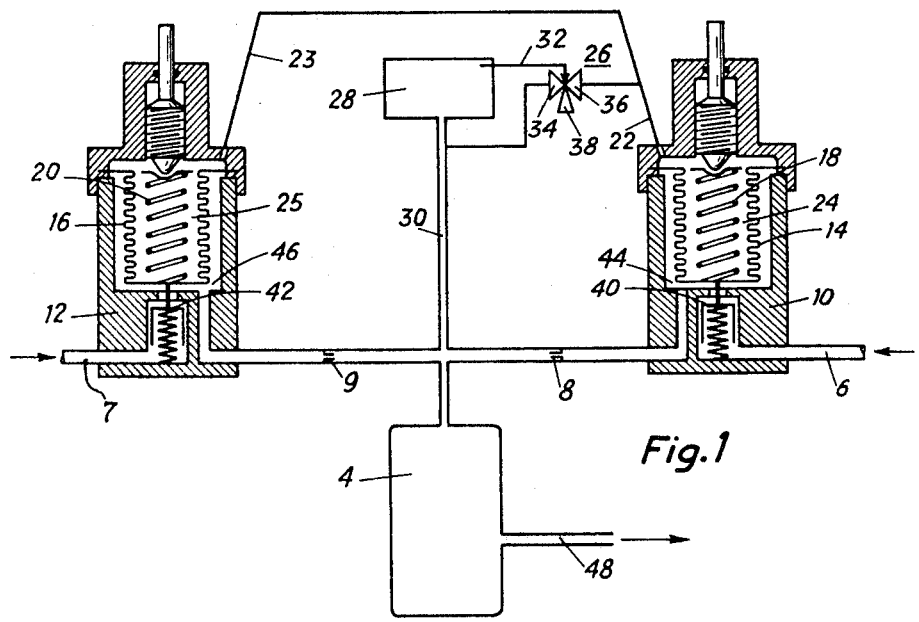
FIG. 1 shows diagrammatically a first embodiment of the invention used for the mixing of two gases.

The device according to FIG. 1 supplies a container 4 with gases arriving through conduits 6, 7. Elements for creating a loss of head 8,9, for example needle valves, are provided in the path of flow of each gas. Upstream of these elements, the pressure of the gases is brought to one and the same value by pressure-reducing valves 10, 12 of a "dome" or "gas tight control chamber" type. In the dome pressure-reducing valves, the bellows 14 or 16 or a similar element is subjected on the one side to the pressure of the expanded gas and on the other side to the combined actions of a spring 18 or 20 and the pressure of a control gas arriving through a conduit 22 or 23. This gas arrives in the domes 24 or 25, that is to say in the space comprised within the bellows, which space is practically not connected with the ambient atmosphere. The pressure of the gas arriving by way of the conduits 22, 23 can be referred to as the "control pressure" of valve 10 or of valve 12 respectively; it is the fluid pressure which acts on the face of the diaphragm or similar element opposite to that on which the expanded fluid acts.

In the present case, in order that the pressure-reducing valves give the same pressure downstream despite variations in the control pressure, it is the same control gas which acts on the two pressure-reducing valves. This control gas is that of the container 4; its supply is controlled by a three-way valve 26 actuated by a constant-pressure controlling element 28.

Element 28 is a kind of manometer; in the present case it is sensitive to the pressure in the container, to which it is connected by a conduit 30; the mobile member of this manometer, symbolised by the arrow 32, actuates valve 26. The inlet way 34 of the valve is connected to the container; one of the outlet ways 36 is connected to the domes of the pressure-reducing valves by the conduits 22,23; the other way 38 is a venting way. An element of this kind is described in the French patent application of the October 30, 1969 for : "Bistable pressure-responsive element for pneumatic or hydraulic control;" it is also possible to use other constant-pressure-controlling elements, for example those which act by means of electrical contacts.

When the pressure in the container has fallen to the fixed minimum value, element 28 makes the ways 34 and 36 communicate. The domes 24 and 25 are thus connected to the pressure of the container 4; the pressure-reducing valves, of the same type, are adjusted so that the action of this pressure and that of the springs 18, 20 open the valve members 40, 42 of the valves as long as the pressure in the expansion chambers 44, 46 does not exceed the control pressure by the value desired for the constant difference between the upstream and downstream sides of the elements 8, 9 producing a loss of head. This is how this pressure difference constancy is achieved. This difference being the same for the two elements 8, 9, the ratio of the deliveries through these depends only on their equivalent cross-section of passage, this section having been adjusted previously in accordance with the desired percentages for the mixture.

When the pressure in the container reaches the fixed maximum, the constant-pressure-reducing element makes the ways 36 and 38 communicate, which connects the domes 24 and 25 to the ambient pressure; the pressure in the domes having greatly decreased, the valve members 40, 42 close, at the same time interrupting the supplying of the various gases composing the mixture. The container 4 is then at its maximum pressure; if mixture is removed, for example through a conduit 48, the pressure drops and, when it reaches the fixed minimum, element 28 makes the ways 34 and 36 communicate as has been described.

The wide opening and the closing of the valve members of the pressure-reducing valves is relatively slow (several tenths of a second generally); this avoids sudden movements of the flowmeters and the bellows.

At the initial filling of the container 4, the pressure downstream of the pressure-reducing valves remains the same for both : it depends on the action of the springs 18, 20, this action being the same if the pressure-reducing valves are of the same type and have been adjusted for same downstream pressure when the control pressures are equal, and on the action of the gas in the domes 24, 25, where the same control pressure prevails.

For reducing the deformation of the bellows, it is possible to connect the way 38 to the free atmosphere, not directly but through a calibrated valve giving a counter-pressure slightly less than the minimum pressure of the container; it is possible to compensate for leakages of this valve by gas coming from a pressure-reducing valve whose downstream pressure is slightly below the pressure for which the calibrated valve is adjusted.

Figure 2:
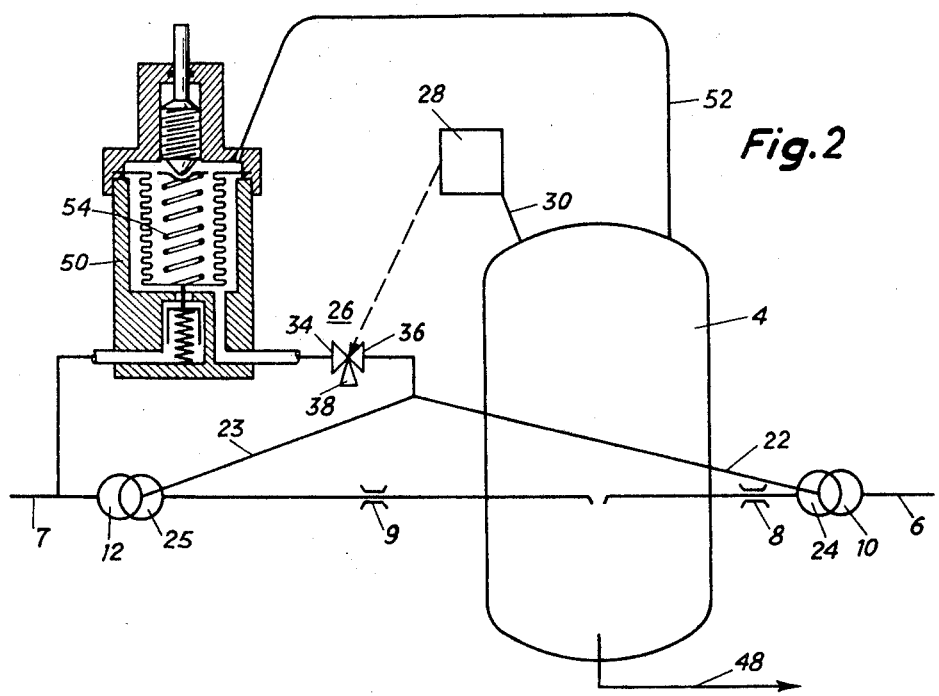
FIG. 2 shows diagrammatically a second embodiment.

FIG. 2 shows a variant of the device shown in FIG. 1 wherein the gas which controls the pressure-reducing valves 10, 12 is not that of the container 4 but a gas supplied by another gas-tight control chamber gas-expansion valve 50. The elements which have the same function as in the device shown in FIG. 1 are designated by the same reference numerals. The expansion valves 24 and 25 are shown in symbolic form in order to leave the drawing clear.

The expansion valve 50 is controlled by the pressure in the container 4, to which it is connected by a conduit 52; to the action of the control pressure there is added that of a spring 54. This pressure-reducing valve for example expands the gas arriving through the conduit 7. It is adjusted to give a downstream pressure slightly greater than the pressure in the container 4, but different therefrom by a fixed quantity owing to its control by the gas of the container 4. The pressure of the control gas of valves 24, 25 then follows, with a constant difference, the pressure in the container; the same applies as regards the pressure downstream of valves 24, 25, and therefore the difference in pressure at the two sides of each of the elements 8, 9 remains constant.

An advantage of this device over that shown in FIG. 1 resides in much greater ease of adjustment : when it is desired to modify the gas delivery without changing the proportions, it is sufficient to adjust the force of the spring 24 instead of adjusting the springs 18 and 20, while ensuring that the pressure downstream of valves 10, 12 remain equal to one another.

The devices described may be modified without departing from the field of the present invention. They may be used for mixing more than two gases, providing one assembly comprising dome expansion valve and head loss-producing element for each gas. The pressure of the gases arriving through the conduits 6 and 7 may be regularised by pressure-reducing valves in order to avoid the effect of the upstream pressure on the downstream pressure in the usual case of non-balanced gas valve members. Valves may be added to complete the closing by valves 10, 12, said additional valves being controlled for example by element 28 at the same time as the valve 26.

In the case of the device shown in FIG. 2, the pressure-reducing valves 10, 12 may not be provided with a spring 18 or 20, except possibly a weak spring permitting the balancing of the pressures upstream of the elements 8, 9. In this way the pressure drop in these expansion valves is reduced.

The pressure-reducing valve 50 can be adjusted to give a downstream pressure equal to or less than the pressure in the container; the pressure-reducing valves 10, 12 must then be provided with springs 18, 20 so that the pressure upstream of the elements 8 and 9 is greater than that in the container. If valve 50 does not comprise a spring 54, it is not possible to effect adjustment by this spring; however an advantage of the device shown in FIG. 2 is preserved: it is the gas of the conduit 7 which passes through some elements and not the gas of the container, which gas may be corrosive or very expensive.

The needle valves 8, 9 may be replaced by calibrated orifices which are changed when the composition of the mixture is to be altered.

The container may be a tank, a conduit supplying a user apparatus or a tank, etc...

The device according to the invention enables a user to produce a mixture or various mixtures under pressure from tanks or from liquefied gas evaporators, containing the components; in this way it avoids having to provide mixture cylinders. The mixtures of gas are used for example for arc welding, for heat tratments or thermo-chemical treatments of metals, for the refining of molten metals, the filling of electrical lamps, and the production of semiconductors.

What I claim is:

1. In a gas-mixing device for filling and for keeping filled between a predetermined minimum and a predetermined maximum pressure a container with a mixture of a plurality of gases in predetermined proportions, from separate sources of these gases, comprising successively for each gas between its gas source and the container a pressure-reducing valve and an element for producing a loss of pressure, the pressure-reducing valves maintaining the gases downstream thereof at substantially the same pressure; the improvement comprising means responsive to the pressure in the container and acting on said pressure-reducing valves for maintaining constant the difference in pressure between each said downstream pressure and the pressure in the container when the pressure-reducing valves deliver gas, each pressure-reducing valve acting independently of any other pressure-reducing valve.

2. A gas-mixing device as claimed in claim 1, said pressure-reducing valves having gastight control chambers, and means varying the pressure in the control chambers as the pressure in the container when the pressure-reducing valves deliver.

3. A gas-mixing device as claimed in claim 2, said control chambers all communicating with said container when said pressure-reducing valves deliver.

4. A gas-mixing device as claimed in claim 3, and a two-position constant pressure-controlling element sensitive to the pressure in the container for controlling the arrival of the gas at said control chambers of said pressure-reducing valves.

5. A gas-mixing device as claimed in claim 4, and a valve actuated by said constant pressure-controlling element to admit to said control chambers one of two different pressures one of which causes the pressure-reducing valves to open when the pressure in the container reaches a predetermined minimum and the other of which causes the pressure-reducing valves to close when the pressure in the container reaches a predetermined maximum.

6. A gas-mixing device as claimed in claim 2, and a further pressure-reducing valve supplying said control chambers when the first-mentioned pressure-reducing valves deliver, said further pressure-reducing valve having a gastight control chamber communicating with said container.

7. A gas-mixing device as claimed in claim 6, and a two-position constant pressure-controlling element sensitive to the pressure in the container for controlling the arrival of the gas at said control chamber of said further pressure-reducing valve.

8. A gas-mixing device as claimed in claim 7, and a valve actuated by said constant pressure-controlling element to admit to said control chamber of said further valve one of two different pressures one of which causes the pressure-reducing valves to open when the pressure in the container reaches a predetermined minimum and the other of which causes the pressure-reducing valves to close when the pressure in the container reaches a predetermined maximum.

* * * * *